United States Patent
Kranzinger

(10) Patent No.: US 9,792,811 B2
(45) Date of Patent: Oct. 17, 2017

(54) METHOD AND SYSTEM TO MONITOR ACCESS RIGHTS FOR A PERSONNEL TRANSPORT SYSTEM THAT INCLUDE AT LEAST ONE DEFINED EMBARKATION AREA AND AT LEAST ONE DEFINED DISEMBARKATION AREA

(71) Applicant: SkiData AG, Grödig/Salzburg (AT)

(72) Inventor: Erich Kranzinger, Strasswalchen (AT)

(73) Assignee: SKIDATA AG, Groedig/Salzburg (AT)

( * ) Notice: Subject to any disclaimer, the term of this patent is extended or adjusted under 35 U.S.C. 154(b) by 423 days.

(21) Appl. No.: 13/799,225

(22) Filed: Mar. 13, 2013

(65) Prior Publication Data
US 2014/0159863 A1   Jun. 12, 2014

(51) Int. Cl.
*G08C 19/00* (2006.01)
*G07B 15/00* (2011.01)
*G06K 9/00* (2006.01)
*G07C 9/00* (2006.01)

(52) U.S. Cl.
CPC ............. *G08C 19/00* (2013.01); *G07B 15/00* (2013.01); *G06K 9/00369* (2013.01); *G07C 9/00111* (2013.01)

(58) Field of Classification Search
CPC .......................... G06K 9/00369; G07B 15/00; G07C 9/00111; G08C 19/00
See application file for complete search history.

(56) References Cited

U.S. PATENT DOCUMENTS

| 5,865,274 | A  | * | 2/1999 | Kiji ..................... B66B 1/2458 187/249 |
| 6,707,374 | B1 | * | 3/2004 | Zaharia ..................... 340/5.31 |
| 8,615,338 | B2 |   | 12/2013 | Creissels |
| 8,880,200 | B2 | * | 11/2014 | Nowel ........................... 700/19 |
| 2002/0034978 | A1 | * | 3/2002 | Legge ............... G07C 9/00111 463/25 |
| 2004/0262383 | A1 |   | 12/2004 | Zielinski |
| 2006/0163008 | A1 | * | 7/2006 | Godwin ................ B66B 9/00 187/288 |

(Continued)

FOREIGN PATENT DOCUMENTS

| EP | 1752931 A1 | 2/2007 |
| JP | 2003132468 A * | 5/2003 ............. G08B 25/04 |
| JP | 205031841 | 2/2005 |

(Continued)

*Primary Examiner* — Nay Tun
(74) *Attorney, Agent, or Firm* — Karl F. Milde, Jr.; Eckert Seamans Cherin & Mellott, LLC

(57) ABSTRACT

Access rights are controlled in a cyclically operated transport system having spatially-defined embarkation and disembarkation areas. The access to the transport system occurs without access monitoring in the embarkation areas, but the access rights of the persons on board the transport system are read remotely during travel by an externally mounted, stationary reading device. If the number of detected valid access rights is less than the number of persons on board the transport system, and/or if a discrepancy exists between the number of detected valid access rights per access right category and the number of persons on board the transport system per access right category, then the access rights are monitored after disembarkation in order to identify the person or persons without access rights.

20 Claims, 1 Drawing Sheet

(56) References Cited

U.S. PATENT DOCUMENTS

2012/0305340 A1* 12/2012 Wu ............................... 187/381
2013/0297093 A1* 11/2013 Nowel .......................... 700/299

FOREIGN PATENT DOCUMENTS

| JP | 2006127344 A | * | 5/2006 |
| JP | 2007326442 | | 12/2007 |
| JP | 2009128924 A | * | 6/2009 |
| JP | 2012207480 A | * | 10/2012 |
| WO | 0107353 A1 | | 2/2001 |
| WO | 03027966 A2 | | 4/2003 |
| WO | 2011066327 | | 6/2011 |

* cited by examiner

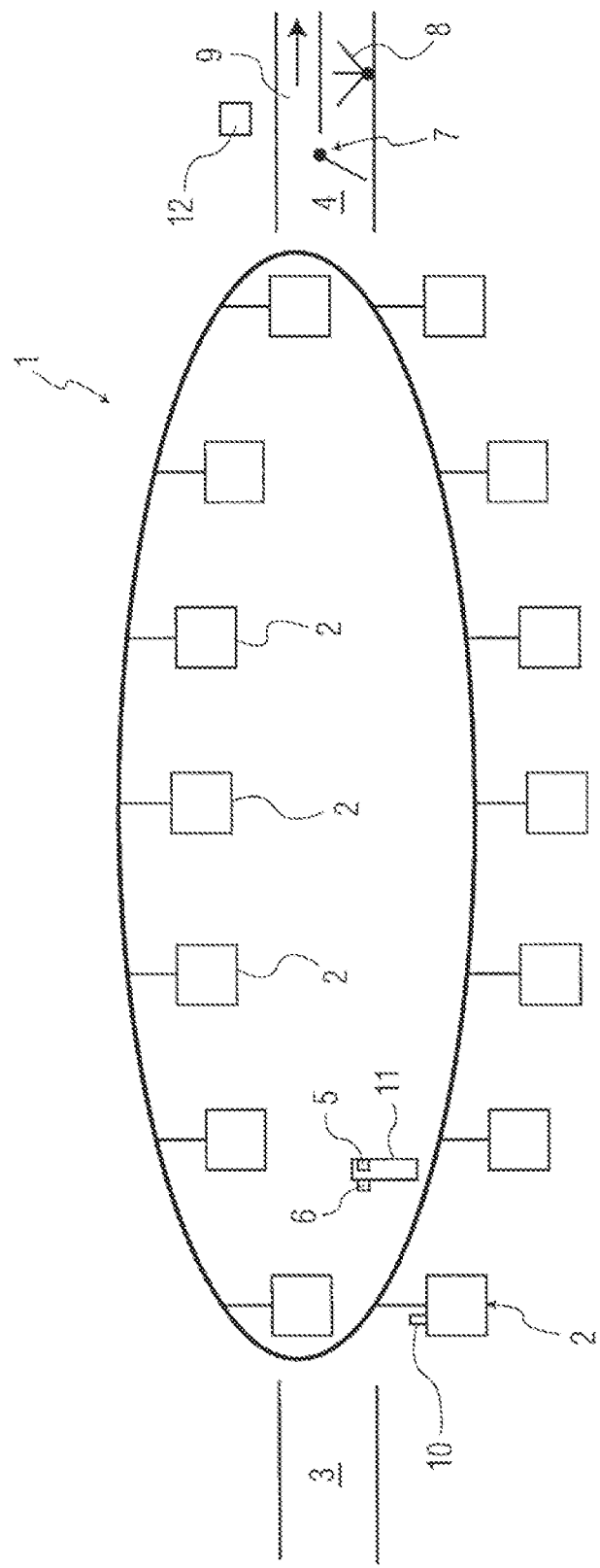

METHOD AND SYSTEM TO MONITOR ACCESS RIGHTS FOR A PERSONNEL TRANSPORT SYSTEM THAT INCLUDE AT LEAST ONE DEFINED EMBARKATION AREA AND AT LEAST ONE DEFINED DISEMBARKATION AREA

BACKGROUND OF THE INVENTION

The invention relates to a method and a system to monitor the access rights for a personnel transport system that include at least one defined embarkation area and at least one defined disembarkation area. The personnel transport system can be used in recreation facilities, particularly ski lifts and cable cars which operate cyclically with prescribed regular distances between them.

It is known from prior art to conduct access monitoring before entry into the personnel transport system for recreation facilities that includes at least one defined embarkation area and at least one defined disembarkation area. Access-monitoring devices are provided before the embarkation area that include equipment to recognize and evaluate access rights along with mechanical or other gates, perhaps in the shape of a turnstiles or so-called flap gates whereby the mechanical gates are manually or automatically released after presentation of a valid access rights.

Disadvantageously, the gate and the resultant blockage of access are very inconvenient. Particularly, the presence of the gate may be found to be unpleasant for children or the elderly. Also, the access monitoring connected with the gate causes stress, which significantly detracts from a recreation experience. With cyclically operated transport systems such as ski lifts and cable cars, this often has the result that the transport system is not utilized to capacity, increasing waiting time and reducing revenue.

Furthermore, the access monitoring mentioned at the outset is also inefficient and costly for the operator of this type of personnel transport system since as a rule the vast majority of users of the personnel transport system are in possession of valid access rights. Since all users of the personnel transport system are monitored in order to detect a typically very small number of non-paying riders, such detection is associated with high expense.

SUMMARY OF THE INVENTION

It is the principal objective of the present invention to provide a method to monitor access rights for cyclically operated transport systems such as ski lifts and cable cars that include at least one defined embarkation area and at least one defined disembarkation area that may be implemented without the gates in the embarkation area and with increased user convenience, fully utilizing the available capacity without detracting from the quality level of monitoring access rights. The method according to the invention also should not detract from the level of individual-data recording for subsequent billing and/or evaluation occurring simultaneously with access monitoring as found in prior art.

It is a further objective to provide a method for access monitoring of cyclically operated personnel transport systems, such as ski lifts and cable cars, that include at least one defined embarkation area and at least one defined disembarkation area in which barriers to entry are not provided at the embarkation area.

These objectives, as well as other objectives which will become apparent from the discussion that follows, are achieved, according to the present invention, by providing a method to monitor access rights in a cyclically operated personnel transport system that includes at least one defined embarkation area and at least one defined disembarkation area. At least one transport-system embarkation area is provided without access monitoring, whereby the access rights of persons travelling on the transport system are remotely monitored using externally arranged, stationary mounted means for remote detection. Within the scope of detecting access rights is also the detection of various access rights categories of an access pass.

When the number of detected valid access rights is less than the number of the persons on board the transport, and/or if a discrepancy exists between the number of detected valid access rights per access right categories and the number of persons on board the transport system per access right category, then after disembarkation into the at least one disembarkation area, monitoring of access rights will be conducted in order to identify the at least one person without valid access rights. If the number of detected valid access rights equals the number of the persons on board the transport, and if no discrepancy exists between the number of detected valid access rights per access right category and the number of persons on board the transport per access right category, then the persons on board the transport system will depart the disembarkation area with no monitoring of access rights.

According to the invention, the number of detected valid access rights per access right category may be transferred to a monitoring system with a control unit provided at the at least one disembarkation area. Transfer of the compiled data to the monitoring system may be via wireless, WLAN, or cable link in the case of a cable car or ski lift.

The method according to the invention may be conducted based merely on the evaluation of the comparison of the number of detected valid access rights with the number of persons on board the transport system, or merely on the evaluation of the comparison of the number of detected valid access rights per access right category with the number of persons per access right category on board the transport system, or it may be based on both evaluations.

Within the scope of a first variant of the method based on the invention, the number of persons on board the transport and the access right categories of persons on board the transport are determined based on visual inspection by personnel at at least one disembarkation area, and are subsequently compared with the data transferred to the monitoring system, whereby based on these detected data and the number of compiled access rights per access right category, it is determined whether the number of detected valid access rights matches the number of persons on board the transport system, and whether a discrepancy exists between the number of compiled access rights per access right category and the number of persons on board the transport system per access right category.

For example, monitoring of access rights is conducted when two valid access rights for children and two valid access rights for adults are detected and displayed by means of the monitoring system, and personnel see four adults in the disembarkation area. Monitoring of access rights may be manual or automatic, e.g., by passing through a conventional access-control device in the form of a turnstile.

Based on another embodiment of the invention, the means for remote acquisition of access rights of the system based on the invention to monitor access rights also compiles the no-longer valid or expired access rights for the transport system and also transfer it to the monitoring system, whereby the work of personnel in the disembarkation area is simplified since information is already available that may indicate persons without valid access rights.

Within the scope of an expanded embodiment of the invention, alternatively or additionally to visual inspection by personnel, the number of persons on board the transport system is determined during travel by means of a device to detect the number of persons on board the transport system, and this number is transferred to the monitoring system, whereby access the right categories of persons on board are determined based on visual inspection by personnel in at least one disembarkation area. Based on these data and the number of detected access rights per access right category, it is determined whether the number of detected valid access rights matches the number of persons on board the transport system, and whether there is a discrepancy between the number of detected valid access rights per access right category and the number of persons on board the transport system per access right category.

For the case in which the number of persons determined by the remote device to detect the presence of persons on board the transport system is greater than the number of detected access rights, this may be displayed in the monitoring system, with optional generation of an optical/acoustic signal.

Within the scope of an expanded embodiment of the invention, categorization during travel of persons based on the type of access rights may be conducted by equipment of the system based on the invention to monitor access rights, whereby the number of detected access rights per access right category is compared with the number of persons on board the transport system per access right category, and in case of a discrepancy between the number of detected access rights per access right category and the number of persons detected per access right category, or between the number of valid access rights determined by the remote detection device and the number of persons on board the transport system, monitoring of access rights is conducted after disembarkation at the disembarkation area, as explained above. In such case, visual inspection may optionally be conducted by system personnel. If there is a discrepancy, the persons on board the transport system may depart the disembarkation area without monitoring.

Based on an advantageous variant of the invention, categorization of persons is based on the age of the person.

In order to simplify the work of personnel and/or to effect automation of the process, an identification signal of the transport system is compiled and transferred to the monitoring system, preferably by the device for remote acquisition of access rights. Alternatively, the identification signal may be transferred via wireless, WLAN, or cable link.

Comparison of detected access rights per access right category with the number of persons detected per access right category and comparison of the number of valid access rights by means of the remote access right detection device with the number of persons on board the transport system are advantageously performed within the control unit, and are displayed in the monitoring system. Optional generation of an optical/acoustic signal may be provided.

Data acquired from the device for remote acquisition of access rights, from the devices to detect the number of persons on board the transport system, and from the device to categorize persons based on the invention to monitor access rights are advantageously transferred to the monitoring system via wireless, WLAN, or cable link, whereby evaluation of compiled data occurs within the control unit.

Based on a particularly advantageous embodiment of the invention, the devices to detect the number of persons are also the devices to categorize persons.

For example, based on evaluation of data from the device to categorize persons, it may be determined how many adults and how many children are on board the transport system, whereby the number of adults and children is compared in the control unit with the number of acquired valid access rights for adults and/or for children. For the case in which more access rights for children are detected than there are children, monitoring of access rights will occur within the disembarkation area in order to detect the adults using the transport system with the access rights of a child.

Based on another embodiment of the invention, depending on signals from an optical and/or acoustic signaling device mounted on the transport system, it is signaled whether a discrepancy exists between the number of acquired valid access rights and the acquired number of persons on board the transport system, and/or whether a discrepancy exists between the number of acquired valid access rights per access right category and the acquired number of persons on board the transport system per access right category. For the case in which no device to categorize persons is provided but merely a discrepancy exists between the number of acquired valid access rights and the acquired number of persons on board the transport system, this is signaled. Control of the optical and/or acoustic signaling device is advantageously transferred via wireless, WLAN, or cable link.

With an optical signaling device, signals are sent using the colors of the optical signals regarding whether a discrepancy exists between the number of acquired valid access rights and the number of persons on board the transport system and, optionally, how large the discrepancy. For example, the color green might signal that the number of persons matches the number of acquired valid access rights, whereas the color red might show a large discrepancy, and the color yellow might show a small discrepancy.

For the case in which categorization of persons based on the type of access rights required is performed by a categorizing device, the optical and/or acoustic signal may also signal a discrepancy between the number of acquired valid access rights per access right category and the number of persons detected per access right category. Optical signaling based on the invention may include two areas that are each assigned to the discrepancy between the number of acquired valid access rights and the number of persons on board the transport system, and to the discrepancy between the number of acquired valid access rights per access right category and the number of persons per access right category.

Within the scope of an advantageous embodiment of the invention, for the case that, after disembarkation, monitoring of access rights is conducted within the disembarkation area, for example if the number of valid access rights is smaller than the number of the persons on board the transport system, and/or if a discrepancy exists between the number of acquired valid access rights per access right category and the number of persons on board the transport system per access right category, then monitoring of access rights after disembarkation in at least one disembarkation area is conducted such that the persons on board the transport system are diverted by a diversion system such that departure of the disembarkation area occurs by means of devices to monitor access rights. It is also possible, of course, for persons to be monitored individually by system personnel.

Based on an advantageous embodiment of the invention, diversion of persons may be automatic. Thus, in the case that the number of the persons on board the transport system during travel is determined using devices to determine the number of valid access rights, and this number is larger than the number of valid access rights and/or categorization of persons based on the type of access rights required that was conducted by means of devices to categorize persons during travel, and a discrepancy exists between the number of acquired valid access rights per access right category and the number of persons on board the transport system per access right category, then diversion based on the identification signal of the transport is automatically performed by activation by the control unit of devices to divert persons such as a chute.

Diversion of persons may also be performed manually by actuation of a switch or mechanical device to activate the diversion, particularly in the case where the number of persons on board the transport system and/or the number of persons per access right category on board is determined by visual inspection.

The devices to monitor access rights preferably include at least one access-monitoring device with a mechanical gate, whereby access rights may be read remotely.

Access rights is preferably recorded onto RFID chips that may be implemented as either active or passive RFID chips, and that may be read by devices used for remote acquisition of the access rights. For this, the reader devices may be mounted in the transport system whereby the number of reader devices may be determined dependent on the size of the transport system.

Alternatively or additionally to reader devices mounted in the transport system, at least one mast or other suitable device may be provided directly after the embarkation area to which at least one reader device is mounted such that access rights of persons on board the transport system may be read as the transport moves past the reader device. This configuration possesses the advantage that the number of required reader devices is reduced. To increase detection reliability, several masts (at least two) or suitable devices may be provided onto which at least one reader device is mounted, whereby data provided by the reader device is compared for consistency.

The devices to determine the number of persons on board the transport system of the system to monitor access rights in a transport system that possesses at least one spatially-defined embarkation area and at least one spatially-defined disembarkation area may be mounted within the transport system. Cameras or infra-red cameras whose images are evaluated manually or automatically, floor-pressure sensors, optical sensors at the entrance to the transport system, or other suitable devices may be used as a device to determine the number of persons on board the transport system. Cameras or infra-red cameras may also be mounted on at least one mast or other device past which the transport system moves, e.g., on a mast or other device on which at least one reader device is mounted. Furthermore, the devices to determine the number of persons on board the transport system may be provided in the embarkation area, whereby the persons are detected as they board the transport system.

For the case in which the device to categorize persons is provided and by means of which devices to determine the number of persons on board the transport system are formed, the devices to determine the number of persons on board the transport system are preferably implemented as cameras with facial-recognition capability, or as floor-pressure sensors at the entrance to the transport system.

Analogously to the devices to determine the number of persons on board the transport system, devices to categorize persons may be mounted within the transport system, or at least on a mast or at least one such device past which the transport system passes. It is also possible to mount these devices within the embarkation area, whereby persons are detected as they board the transport system.

The relocation of the read-out of access rights from the embarkation area to the transport area based on the invention's concept, and the conduction of any required monitoring at the disembarkation area, achieve the advantage that, as a rule, users of the transport system, e.g., users of a ski lift or cable car may embark and disembark without any type of monitoring, which represents a significant increase in convenience. For the case in which persons without access rights use the transport system, their detection and identification is also ensured. Since as a rule the percentage of persons traveling without access rights is less than 1%, the number of cases of diversion of persons at the disembarkation area is very small.

Independent of their noticeability detected based on the invention, and on a manually- or automatically-actuated monitoring, it is possible at any time to subject persons on board the transport system to suitable monitoring and/or to divert them to a monitoring device.

Furthermore, it is ensured by the invention that the number of persons using a transport system is determined, which may be used, for example, in evaluations. Determination of the number of persons may advantageously result in increased convenience since, in the case where a transport system is at full capacity, this may be displayed optically and/or acoustically in at least one embarkation area.

These transport systems are preferably transport systems for recreation facilities, e.g., ski lifts or cable cars. Since such transport systems, e.g., gondolas, can transport a limited number of persons, reduced convenience from subsequent monitoring is very small in the case of a discrepancy between the quantity and/or quality of detected valid access rights and the persons being transported. Also, the transport system may be public transport, for example railways including commuter rail, streetcars, and subways.

For a full understanding of the present invention, reference should now be made to the following detailed description of the preferred embodiments of the invention as illustrated in the accompanying drawings.

BRIEF DESCRIPTION OF THE DRAWING

The single FIGURE (FIG. 1) is a schematic diagram of a transport system according to the invention.

DESCRIPTION OF THE PREFERRED EMBODIMENTS

The transport system of FIG. 1, which monitors access rights in ski or mountain areas, possesses devices for remote detection of access rights and devices to determine the number of persons on board. This system is described in detail in the following using a mountain tramway with several small gondolas as an example of a cyclically operated transport.

FIG. 1 schematically shows a mountain lift transport system, identified with the reference numeral 1, that includes several gondolas 2 that travel between a spatially-defined embarkation area 3 at the valley station to a spatially-defined disembarkation area 4 at the mountain station. Based on the invention, access to the gondolas 2 is provided at the embarkation area 3 without monitoring of access rights, and the access rights of persons in the gondola during travel is read remotely using devices 5 to remotely detect access rights. The access rights are stored on RFID chips, for example, which may be implemented as active or passive RFID chips and read by RFID reader devices.

The number of detected valid access rights per access right category is transferred to a monitoring system 12 provided at the disembarkation area to monitor access rights for the transport system that includes a control unit, and is displayed at a display device. For this, the identification signal of a gondola 2, which may, for example, be read by the devices for remote acquisition of access rights, is transferred to the monitoring system 12. Furthermore, devices 6 are provided to detect the number of persons in the gondola 2, whereby the acquired number of persons is also transferred to the monitoring system 12.

Based on the acquired number of persons in the gondola 2 and the number of detected valid access rights per access right category, the control unit determines and displays whether the number of detected valid access rights per access right category matches the number of persons in the gondola 2, whereby based on visual inspection, the access rights of the persons in gondola 2 may be determined, so it may be determined whether a discrepancy exists between the number of detected valid access rights per access right category and the number per access right category of persons in the gondola 2.

If the number of detected valid access rights per access right category matches the number of persons in the gondola 2, and no discrepancy exists between the number of detected valid access rights per access right category and the number per access right category of persons in the gondola 2, the persons in the gondola 2 depart the disembarkation area 4 through a free passage 9 without any monitoring. If this is not the case, monitoring of access rights will occur in the disembarkation area 4 in order to identify the at least one rider with no access rights.

In the illustrated example, for the purpose of monitoring access rights, the persons in the gondola 2 after disembarkation in the disembarkation area 4 are diverted and led through an access right monitoring device 8 with a mechanical gate, which may be implemented as a turnstile. Diversion of persons is performed here by means of devices 7 to divert persons that may be activated by means of a switch or mechanical device, so that, upon arrival of the gondola 2 to the disembarkation area 4, the persons are diverted whereby the free passage 9 is blocked by means of a blocking element 7, and departure from the disembarkation area 4 is possible only by passing through the access right monitoring device 8.

The method based on the invention may be conducted without visual inspection to determine the number of persons per access right category in the gondola 2, whereby in such case, the only criterion for conduction of monitoring of access rights in the disembarkation area 4 is a discrepancy between the number of detected valid access rights and the detected number of persons in the gondola 2. Since the data from the devices for remote acquisition of access rights, from the devices to determine the number of persons in the gondola 2, and from the identification signal of the gondola 2 are transferred to the monitoring system and evaluated by the control unit, diversion of persons in case of a discrepancy may be automated, whereby the devices 7 to divert persons is activated and/or suitably controlled by the control unit.

In the embodiment illustrated in FIG. 1, an optical/acoustic signaling device 10 is mounted on each gondola 2, whereby the colors of the optical signals indicate whether or not a discrepancy exists between the detected valid access rights and the persons on board the gondola 2, and optionally, how large the discrepancy is.

Also in the embodiment illustrated in FIG. 1, the RFID reader devices 5 are mounted on a mast or post 11 or other suitable stationary device, whereby the access rights of the persons on board the gondola 2 are read when the gondola 2 passes by the reader device 5.

As the device to detect the number of persons on board the transport system in the illustrated embodiment, at least one camera or infra-red camera 6 is mounted on the mast or post 11 past which the gondola 2 travels, e.g., on the mast 11 on which at least one reader device 5 is mounted.

For the case in which two embarkation areas and two disembarkation areas are used, i.e. at a valley and at a mountain station, the method based on the invention is used for both directions of travel. In this case, a second disembarkation area analogous to the disembarkation area 4 at the mountain station is provided adjacent to the valley-station embarkation area 3, and an additional embarkation area without access monitoring is provided at the mountain station adjacent to its disembarkation area 4.

There has thus been shown and described a novel method and system to monitor access rights for a personnel transport system that include at least one defined embarkation area and at least one defined disembarkation area which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for controlling personnel utilization of a cyclically operated personnel transport system having a plurality of transport vehicles connected one-to-another in series, in an endless loop, so as to move together, repeatedly travelling in said loop, each vehicle in succession, from a spatially-defined embarkation area to an associated and respective spatially-defined separate disembarkation area and returning again to the embarkation area, wherein personnel entry to the transport system occurs without access monitoring at the embarkation area, said method comprising the steps of:

(a) remotely detecting valid access rights of persons on board the transport system during travel by means of at least one stationary, ground-mounted device for remote, wireless detection of the access rights using mobile devices associated with said persons, (b) if a detected number of valid access rights is less than the actual number of persons on board the transport system, or if a discrepancy exists between the a detected number of valid access rights for an access right category and the actual number of persons on board the transport system for the access right category of the transport system, controlling the persons transported on board the transport system at said disembarkation area to identify the ones who were transported without valid access rights for that access right category, and (c) if the detected number of valid access rights matches the number of persons on board the transport system and no discrepancy exists between the detected number of valid access rights for the access right category and the actual number of persons on board the transport system for the access right category, then allowing the persons transported on board the transport system to depart at said disembarkation area without any type of monitoring.

2. The method for controlling personnel utilization of a transport system as defined in claim 1, wherein a monitoring system with a control unit and a display device is provided at said disembarkation area, said method further comprising the steps of transferring a detected number of valid access rights for the access right category to said monitoring system and displaying said detected number on said display device.

3. The method for controlling personnel utilization of a transport system as defined in claim 2, further comprising the steps of determining a viewed number of persons on board the transport system and viewed access right categories of persons on board the transport system by means of personnel, based on visual inspection at said disembarkation area, and subsequently comparing said viewed number with the detected number transferred to the monitoring system and determining whether the detected number of valid access rights matches the viewed number of persons on board the transport system, and whether a discrepancy exists between the detected number of access rights for the access right category and the viewed number of persons on board the transport system for the access right category.

4. The method for controlling personnel utilization of a transport system as defined in claim 2, wherein the number of persons on board the transport system during travel is detected remotely by means of said stationary mounted device and by said mobile devices and said detected number of persons is transferred to the monitoring system, and wherein viewed access right categories of persons on board the transport system are determined by personnel based on visual inspection at said disembarkation area, and based on the detected number of persons and the viewed number of persons for the access right category, determining whether the detected number of persons with valid access rights matches the viewed number of persons on board the transport system, and whether a discrepancy exists between the detected number of persons for the access right category and the viewed number of persons on board the transport system for the access right category.

5. The method for controlling personnel utilization of a transport system as defined in claim 4, wherein the detected number of persons on board the transport system during travel is determined remotely by means of said stationary mounted device and said mobile devices for remote detection of persons located on the transport system and this detected number is transferred to the monitoring system, and wherein access right categories of persons on board the transport system are determined based on the type of access rights required, wherein said detected number and the determined access right categories are transferred to the monitoring system, and wherein, based on said detected number and the determined access right categories, it is determined whether the detected number of valid access rights matches the viewed number of persons on board the transport system, and whether a discrepancy exists between the number of access rights for the access right category and the number of persons on board the transport system for the access right category.

6. The method for controlling personnel utilization of a transport system as defined in claim 4, wherein the transport system includes a signaling device mounted thereon, said method further comprising the step of signaling whether a discrepancy exists between the detected number of valid access rights and the detected number of persons on board the transport system, and whether a discrepancy exists between the detected number of valid access rights for the access right category and the detected number of persons on board the transport system for the access right category.

7. The method for controlling personnel utilization of a transport system as defined in claim 4, wherein the at least one device to detect persons on board the transport system is selected from the group consisting of an optical camera, an infra-red camera, a floor-pressure sensor and an optical sensor.

8. The method for controlling personnel utilization of a transport system as defined in claim 2, further comprising the step of detecting an identification signal of the transport system and transmitting the identification signal to the monitoring system.

9. The method for controlling personnel utilization of a transport system as defined in claim 8, wherein a monitoring system comprising a system control unit and a display device is provided in said disembarkation area, to which data acquired by at least one of (a) the device for remote acquisition of access rights, (b) the device to detect the number of persons on board the transport system, and (c) the device to categorize persons and also the identification signal from the transport system are transmitted to the monitoring system via a telecommunication link, whereby evaluation of compiled data occurs within the control unit.

10. The method for controlling personnel utilization of a transport system as defined in claim 8, wherein at least one device to divert persons is provided in said disembarkation area, said person diverting device being activated to cause persons who disembark the transport system to be diverted when the number of persons determined by the at least one device for remote detection of persons on board the transport system during travel is greater than the detected number of access rights or a categorization of persons for the type of access rights required as performed by at least one device to categorize persons, and when a discrepancy exists between the detected number of valid access rights for the access right category and the number of persons on board the transport system for the access right category, the activation of the diverting device occurring automatically based on the identification signal of the transport system.

11. The method for controlling personnel utilization of a transport system as defined in claim 8, wherein the identification signal of the transport system is detected remotely by means of the at least one device for remote detection of access rights.

12. The method for controlling personnel utilization of a transport system as defined in claim 1, wherein if the detected number of valid access rights is less than the number of the persons on board the transport system, and if a discrepancy exists between the detected number of valid access rights for the access right category and the detected number of persons for the access right category on board the transport system, then after disembarkation of persons into said disembarkation area, diverting said persons in said disembarkation area by means of a personnel diversion device, and controlling a departure of persons from said disembarkation area with the aid of said diversion device.

13. The method for controlling personnel utilization of a transport system as defined in claim 12, wherein, if the number of persons on board the transport system is determined to be larger than the detected number of valid access rights or a categorization of persons based on the type of access rights required, that was conducted during travel by means of a device to categorize persons, or a discrepancy exists between the number of acquired valid access rights for the access right category and the number of persons on board the transport system for the access right category, then a diversion of persons is performed by activation of said personnel diversion device.

14. The method for controlling personnel utilization of a transport system as defined in claim 1, wherein said at least one stationary mounted device for remote detection of access rights during travel is mounted on at least one of (a) a transport vehicle within the transport system, (b) at least one stationary mast and (c) at least one other stationary device past which the transport vehicle of the transport system moves, wherein exit from the transport system is possible without access monitoring in said disembarkation area, and wherein at least one access-monitoring device is provided in said disembarkation area through which the persons on board the transport system are diverted when a discrepancy exists between the detected number of valid access rights and the actual number of persons on board the transport system, or between the detected number of valid access rights for the access right category and the actual number of persons on board the transport system for the access right category.

15. The method for controlling personnel utilization of a transport system as defined in claim 14, wherein at least one device is provided for remote detection of persons located on board the transport system during travel, such device being mounted on at least one of (a) the transport vehicle within the transport system, (b) at least one stationary mast, and (c) at least one other stationary device past which the transport vehicle of the transport system travels.

16. The method for controlling personnel utilization of a transport system as defined in claim 14, wherein at least one device is provided to categorize persons during travel on the transport system, by means of which categorization of the persons on board the transport system is conducted based on the type of access rights required, such device being mounted on at least one of (a) the transport vehicle within the transport system, (b) at least one stationary mast, and (c) at least one other stationary device past which the transport vehicle of the transport system travels.

17. The method for controlling personnel utilization of a transport system as defined in claim 16, wherein categorization of the persons on board the transport system for the type of access rights required is carried out by said at least one device for remote detection of persons located on board the transport system.

18. The method for controlling personnel utilization of a transport system as defined in claim 14, wherein a telecommunication signaling device is mounted on the transport system by means of which, in response to said at least one device to detect the number of persons on board the transport system and the device to categorize persons, it is signaled whether a discrepancy exists between the detected number of valid access rights and the number of persons on board the transport system, and whether a discrepancy exists between the detected number of valid access rights for the access right category and the number of persons for the access right category, whereby the signaling device transmits signals via a telecommunication link.

19. The method for controlling personnel utilization of a transport system as defined in claim 14, wherein the at least one access monitoring device includes at least one personnel access-control device with a mechanical gate.

20. The method for controlling personnel utilization of a transport system as defined in claim 1, wherein access rights are stored on RFID chips, and wherein the at least one device for remote detection of access rights is an RFID reader device.

* * * * *